(12) United States Patent
Manadhata et al.

(10) Patent No.: US 11,271,963 B2
(45) Date of Patent: Mar. 8, 2022

(54) DEFENDING AGAINST DOMAIN NAME SYSTEM BASED ATTACKS

(71) Applicant: ENTIT SOFTWARE LLC, Sanford, NC (US)

(72) Inventors: Pratyusa K. Manadhata, Piscataway, NJ (US); Martin Arlitt, Calgary (CA)

(73) Assignee: Micro Focus LLC, Santa Clara, CA (US)

( * ) Notice: Subject to any disclaimer, the term of this patent is extended or adjusted under 35 U.S.C. 154(b) by 396 days.

(21) Appl. No.: 16/227,750

(22) Filed: Dec. 20, 2018

(65) Prior Publication Data
US 2020/0204581 A1 Jun. 25, 2020

(51) Int. Cl.
*G06F 11/00* (2006.01)
*H04L 29/06* (2006.01)
*H04L 61/4511* (2022.01)
*G06F 12/14* (2006.01)

(52) U.S. Cl.
CPC ...... *H04L 63/1458* (2013.01); *H04L 61/1511* (2013.01); *H04L 63/10* (2013.01); *H04L 2463/141* (2013.01)

(58) Field of Classification Search
CPC ........... H04L 2463/141; H04L 61/1511; H04L 63/10; H04L 63/1458; H04L 61/6009; H04L 63/0245
See application file for complete search history.

(56) References Cited

U.S. PATENT DOCUMENTS

| | | | |
|---|---|---|---|
| 8,260,914 B1 * | 9/2012 | Ranjan | H04L 61/1511 709/224 |
| 8,516,585 B2 | 8/2013 | Cao et al. | |
| 8,898,773 B2 | 11/2014 | Kummu et al. | |
| 9,245,121 B1 | 1/2016 | Luo et al. | |
| 9,325,735 B1 * | 4/2016 | Xie | H04L 63/02 |
| 9,405,903 B1 * | 8/2016 | Xie | H04L 63/1425 |
| 9,479,524 B1 | 10/2016 | Hagen | |
| 9,516,039 B1 | 12/2016 | Yen et al. | |
| 9,602,525 B2 | 3/2017 | Qian et al. | |
| 9,602,538 B1 | 3/2017 | Chou | |

(Continued)

FOREIGN PATENT DOCUMENTS

CN  105024969 A  11/2015
CN  105681133 A  6/2016
(Continued)

OTHER PUBLICATIONS

3 Ways to Rethink and Simplify Telecom DNS, http://www.efficientip.com/3-ways-to-rethink-and-simplify-telecom-dns/—downloaded Aug. 27, 2018 (5 pages).

(Continued)

*Primary Examiner* — Gary S Gracia (57) ABSTRACT

In some examples, a Domain Name System (DNS) server receives, over a network, DNS queries containing domain names, extracts a common domain name shared by the domain names, determines whether a measure of an amount of data relating to the DNS queries containing the common domain name exceeds a threshold, and in response to determining that the measure of the amount of data relating to the DNS queries containing the common domain name exceeds the threshold, trigger a countermeasure action to address a threat associated with the DNS queries.

20 Claims, 3 Drawing Sheets

---

302 — Receive, by a DNS server, a DNS query from an electronic device over a network 304 — Determine, by the DNS server, whether a network address associated with the DNS query belongs to the network 306 — In response to determining that the network address associated with the DNS query belongs to a different network, trigger, by the DNS server, a countermeasure action to address a threat associated with the DNS query

(56) References Cited

U.S. PATENT DOCUMENTS

| | | | |
|---|---|---|---|
| 9,686,291 B2 | 6/2017 | Antonakakis et al. | |
| 9,756,063 B1 | 9/2017 | Chung | |
| 9,781,139 B2 | 10/2017 | Sofka et al. | |
| 2012/0084860 A1* | 4/2012 | Cao | H04L 63/1441 726/23 |
| 2012/0254996 A1* | 10/2012 | Wilbourn | H04L 61/6009 726/22 |
| 2015/0229668 A1* | 8/2015 | Boodaei | H04L 61/20 726/22 |
| 2015/0242636 A1* | 8/2015 | Khan | G06F 21/577 726/25 |
| 2016/0099967 A1* | 4/2016 | Stemm | G06F 21/55 726/1 |
| 2016/0248805 A1* | 8/2016 | Burns | H04L 63/1441 |
| 2016/0337391 A1 | 11/2016 | McKinney | |
| 2016/0352679 A1 | 12/2016 | Josiah et al. | |
| 2016/0352772 A1 | 12/2016 | O'Connor | |
| 2017/0070595 A1* | 3/2017 | Gould | H04L 67/02 |
| 2017/0163754 A1* | 6/2017 | Johnson | H04L 63/1433 |
| 2017/0295196 A1* | 10/2017 | Arnell | H04L 63/1425 |
| 2018/0183830 A1* | 6/2018 | Wessels | H04L 63/1425 |
| 2018/0351972 A1* | 12/2018 | Yu | H04L 63/1416 |
| 2018/0351976 A1* | 12/2018 | Shitrit-Efergan | H04L 63/1458 |
| 2019/0052675 A1* | 2/2019 | Krebs | H04L 63/1416 |
| 2019/0334931 A1* | 10/2019 | Arlitt | H04L 63/1416 |
| 2020/0005093 A1* | 1/2020 | Vichare | G06K 9/6223 |

FOREIGN PATENT DOCUMENTS

| | | |
|---|---|---|
| CN | 106911717 A | 6/2017 |
| WO | WO-2017030569 A1 | 2/2017 |
| WO | WO-2017139489 A1 | 8/2017 |

OTHER PUBLICATIONS

Ahluwalia et al., Detecting Broad Length Algorithmically Generated Domains, Oct. 11, 2017, https://link.springer.com/chapter/10.1007/978-3-319-69155-8_2 (16 pages).

Antonakakis et al., Damballa Inc., Detecting Malware Domains at the Upper DNS Hierarchy, Aug. 12, 2011 (16 pages).

Antonakakis et al., From Throw-Away Traffic to Bots: Detecting the Rise of DGA-Based Malware, 2012 (16 pages).

Ashraf Abu-Alia, Detecting Domain Flux Botnet using Machine Learning Techniques. Feb. 2015 http://qspace.qu.edu.qa/bitstream/handle/10576/3279/Abu-Alia%2C%20Ashraf.pdf?sequence=4&isAllowed=y (104 pages).

Bortzmeyer, Internet Engineering Task Force (IETF), Request for Comments: 8020, Updates: 1034, 2308, Category: Standards Track, NXDOMAIN: There Really Is Nothing Underneath, Nov. 2016 (10 pages).

Cloudflare, Shield Your DNS Infrastructure from DDoS Attacks with Cloudflare's DNS Firewall downloaded Nov. 16, 2018 (15 pages).

Darling et al., A Lexical Approach for Classifying Malicious URLs, 2015, http://ieeexplore.ieee.org/abstract/document/7237040/ (8 pages).

Fu et al., Abstract Only, Stealthy Domain Generation Algorithms, Feb. 13, 2017 http://ieeexplore.ieee.org/document/7852496/ (5 pages).

HP ArcSight DNS Malware Analytics, Datasheet, Aug. 2015 (2 pages).

Infoblox, Authoritative Domain Name Server dated on or before Apr. 28, 2017 (4 pages).

Infoblox, Stop Data Theft Cold, 2018 (12 pages).

Lee et al., Domain Name Service (DNS) dated on or before Feb. 20, 2018 (26 pages).

Manadhata et al., U.S. Appl. No. 15/884,978 entitled Indicating Malware Generated Domain Names Using N-Grams filed Jan. 31, 2018 (30 pages).

Manadhata et al., U.S. Appl. No. 15/884,983 entitled Indicating Malware Generated Domain Names Using Digits filed Jan. 31, 2018 (30 pages).

Manadhata et al., U.S. Appl. No. 15/884,988 entitled Malware-Infected Device Identifications filed Jan. 31, 2018 (38 pages).

Martin Arlitt et al., U.S. Appl. No. 15/963,336 entitled Determining Potentially Malware Generated Domain Names filed Apr. 26, 2018 (39 pages).

Martin Boasson Nordby, Security Incident Detection with Passive DNS Logs, May 2, 2014 https://www.duo.uio.no/bitstream/handle/10852/42055/Nordby-Master.pdf?sequence=29 (84 pages).

Mockapetris, Network Working Group, Request for Comments: 1035, Obsoletes: RFCs 882, 883, 973, Domain Names—Implementation and Specification, Nov. 1987 (55 pages).

Mowbray et al., Finding Domain-Generation Algorithms by Looking at Length Distributions, 2014, https://pdfs.semanticscholar.org/bc12/34d57c2bfae6bcc6a8f1f1743ba42b8317ed.pdf (6 pages).

Nominum, Nominum Offers Analysis of 15.3 Trillion DNS Records to Explain Rapid Growth and Evolution of Cybercrime in New Spring 2017 Security Report, May 2, 2017 (3 pages).

Osint Feeds From Bambenek Consulting, Master Feeds downloaded Jan. 3, 2018, http://osint.bambenekconsulting.com/feeds/ (3 pages).

Plohmann et al., A Comprehensive Measurement Study of Domain Generating Malware, Proceedings of the 25th USENIX Security Symposium, Aug. 2016 (17 pages).

Prince, Matthew, Announcing 1.1.1.1: the fastest, privacy-first consumer DNS service, Apr. 1, 2018 (21 pages).

Schiavoni et al., Phoenix: DGA-based Botnet Tracking and Intelligence, 2014 (20 pages).

Secure64, Secure64® DNS CACHE™ Scalable, secure caching DNS, 2017 (2 pages).

Wang et al., Breaking Bad: Detecting Malicious Domains Using Word Segmentation, Jun. 2015 https://arxiv.org/pdf/1506.04111.pdf (7 pages).

Wikipedia, Botnet last edited Dec. 22, 2017 (8 pages).

Wikipedia, Edit distance iast edited Dec. 29, 2017 (5 pages).

Wikipedia, Levenshtein distance last edited Jan. 6, 2018 (8 pages).

Woodbridge et al., Predicting Domain Generation Algorithms with Long Short-Term Memory Networks, Nov. 2, 2016, http://www.covert.io/research-papers/deep-learning-security/Predicting%20Domain%20Generation%20Algorithms%20with%20Long%20Short-Term%20Memory%20Networks.pdf (13 pages).

Yadav et al., Detecting Algorithmically Generated Malicious Domain Names, Nov. 1-3, 2010, http://citeseerx.ist.psu.edu/viewdoc/download?doi=10.1.1.221.1167&rep=rep1&type=pdf (14 pages).

* cited by examiner

DEFENDING AGAINST DOMAIN NAME SYSTEM BASED ATTACKS

BACKGROUND

A piece of malware can infect a system, where the malware can perform various malicious activities. Such malicious activities can attack another system belonging to a different enterprise to render a resource of the other system unavailable for normal use, can cause exfiltration of data, can result in unauthorized access of a resource, and so forth.

BRIEF DESCRIPTION OF THE DRAWINGS

Some implementations of the present disclosure are described with respect to the following figures.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

In the present disclosure, use of the term "a," "an", or "the" is intended to include the plural forms as well, unless the context clearly indicates otherwise. Also, the term "includes," "including," "comprises," "comprising," "have," or "having" when used in this disclosure specifies the presence of the stated elements, but do not preclude the presence or addition of other elements.

A Domain Name System (DNS) is a component of a network that translates human-friendly domain names into computer-useable network addresses, such as Internet Protocol (IP) addresses (and vice versa). For example, when a user types "abc.com" into a web browser on an electronic device, the electronic device does not know where the web server that hosts "abc.com" is located. The electronic device can send a DNS query to a DNS server (or multiple DNS servers) to obtain the web server's network address, such as an Internet Protocol (IP) address, and possibly other information.

DNS can be exploited by malware code to attack a network (such as a denial-of-service attack), to steal stored information, to transmit spam or ransomware, or to perform other malicious activities. Because DNS is fundamental to network communications, even the most security concerned enterprise allows DNS communication between electronic devices in the enterprise's network and the outside world. DNS's relative openness has led to various abuses, where malware code can employ a DNS server to cause a denial-of-service (DoS) attack, to steal information, to perform unauthorized access of a resource, and so forth.

Traditionally, a dedicated analysis system separate from a DNS server can collect and log data of DNS packets, analyze the data, and determine whether malicious activities are present based on the analysis. The dedicated analysis system can be implemented with a hardware appliance or multiple hardware appliances (e.g., computers, processors, etc.) along with corresponding machine-readable instructions executable on the hardware appliance(s).

Within an enterprise (e.g., a company, an educational organization, a government agency, a home, etc.), electronic devices can issue a large number of DNS queries to perform lookups for retrieving network addresses corresponding to respective domain names.

As a result, the volume of data to be analyzed by a dedicated analysis system can be quite large. Providing a dedicated analysis system that can adequately perform the analysis can be expensive, and some network administrators may be unwilling to add such a dedicated analysis system due to the increased costs. In addition, if there is a large volume of DNS data, then a large data storage system would have to be allocated to store the DNS data. In addition, sending DNS data to the dedicated analysis system for analysis involves the communication of data over a network, which can consume network resources of an enterprise. Further, once a threat is detected based on the analysis of the DNS data, a security analyst can perform remediation actions, which can involve interacting with a DNS server to take steps to address the threat. Such interactions by security analysts can take time, which can enable a malicious activity to continue for an extended period of time.

In accordance with some implementations of the present disclosure, to defend against a DNS-based attack (where defending against a DNS-based attack can include preventing the DNS-based attack or restricting the ability of an attacker to exploit DNS for an unauthorized purpose), a DNS server can receive, over a network, DNS queries containing domain names, determine whether a measure of an amount of data relating to the DNS queries containing the common domain name exceeds a threshold, and in response to determining that the measure of the amount of data relating to the DNS queries containing the common domain name exceeds the threshold, trigger a countermeasure action to address a threat associated with the DNS queries.

A "common domain name" refers to a segment of multiple domain names that are shared by the multiple domain names. For example, xyz.microfocus.com, 456.microfocus.com, and 123.microfocus.com share "microfocus.com" as the common domain name. The threat associated with the foregoing detection can include a DoS attack (including a distributed DoS (DDoS) attack, or exfiltration of data from a network.

In further implementations, a DNS server receives a DNS query from an electronic device over a network, determines whether a network address associated with the DNS query belongs to the network, and in response to determining that the network address associated with the DNS query belongs to a different network, triggers a countermeasure action to address a threat associated with the DNS query.

Figure 1:
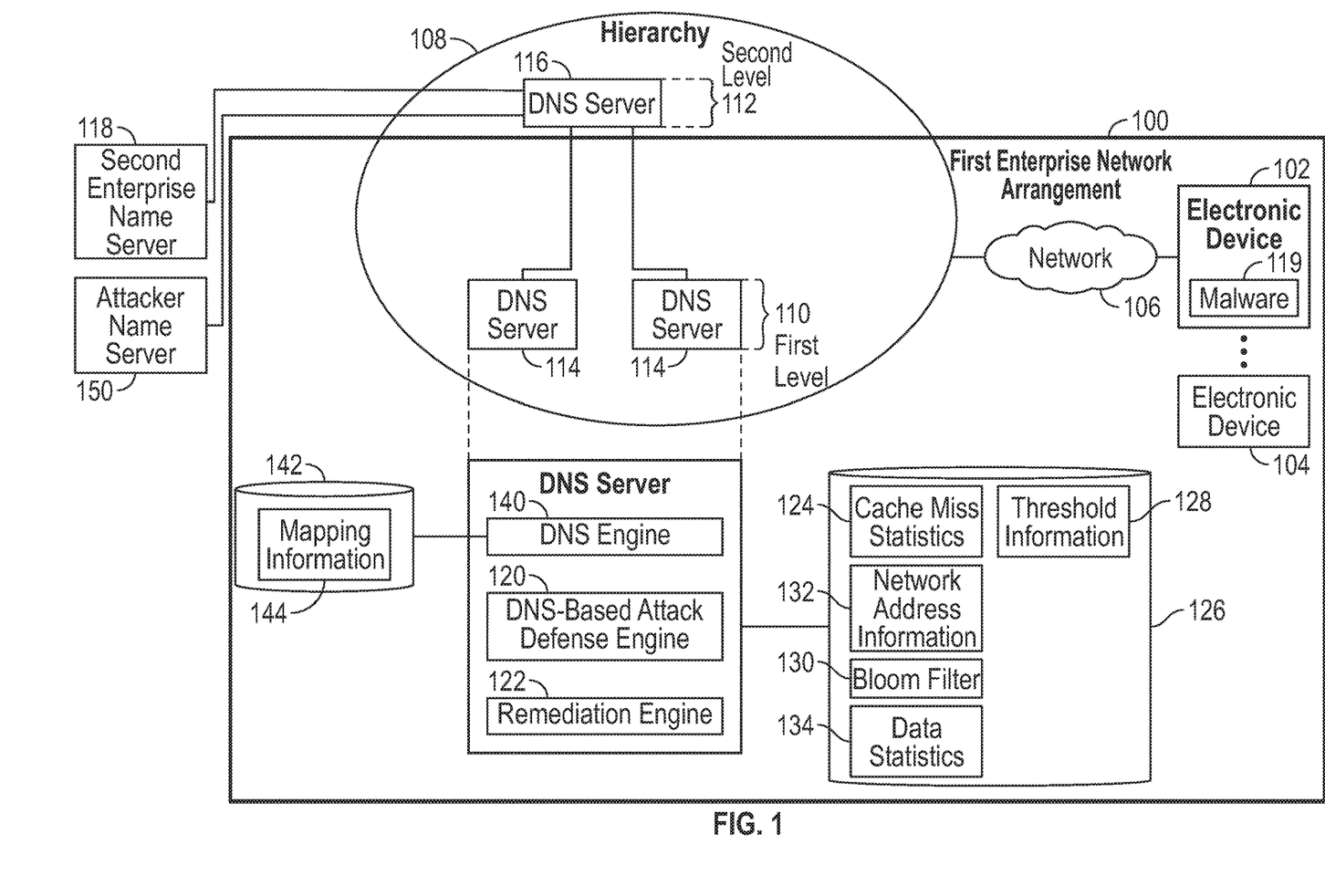
FIG. 1 is a block diagram of an arrangement that includes a hierarchy of DNS servers, a name server, and electronic devices according to some examples.

FIG. 1 is a block diagram of an example network arrangement 100 that includes various electronic devices 102 and 104 that are coupled over a network 106. Although not shown, the network 106 can include switches and routers. The network arrangement 100 may be operated by a first enterprise.

Examples of the electronic devices 102 and 104 can include any of the following: a notebook computer, a desktop computer, a tablet computer, a smartphone, a server computer, a communication node, a wearable device (e.g., a smart watch, smart eyeglasses, a head-mounted device, etc.), a game appliance, an Internet of Things (IoT) device (e.g., a network-connected sensor, a network-connected camera, a network-connected thermostat, etc.), a vehicle, a server computer, a storage server, a communication node (e.g., a switch, a router, etc.), and so forth.

The network 106 can include a wired network and/or a wireless network. A wireless network can include a wireless local area network (WLAN), a cellular network, and so forth. The network 106 can include a public network (e.g., the Internet), a private network (e.g., a local area network), or a combination of both.

Although just two electronic devices 102 and 104 are shown in FIG. 1, it is noted that in other examples, the network arrangement 100 can include a larger number of electronic devices that can communicate over the network 106.

A hierarchy 108 of DNS servers can be coupled to the network 106. A DNS server can be implemented as a hardware processing circuit, which can include any one or some combination of the following: a microprocessor, a core of a multi-core microprocessor, a microcontroller, a programmable integrated circuit, a programmable gate array, or any other hardware processing circuit. Alternatively, a DNS server can be implemented as a combination of a hardware processing circuit and machine-readable instructions (software and/or firmware) executable on the hardware processing circuit.

The hierarchy 108 of DNS servers include multiple DNS servers at different levels of the hierarchy 108. In the example of FIG. 1, the different levels of DNS servers include a first level 110 of the hierarchy 108 and a second level 112 of the hierarchy 108. The first level 110 includes DNS servers 114, and a second level 112 includes a DNS server 116. Although just two levels of DNS servers are shown as being part of the hierarchy 108, it is noted that in other examples, DNS servers can be arranged in more than two levels. In the example hierarchy 108, the DNS servers 114 of the first level 110 are part of the network arrangement 100 of a first enterprise. The DNS server 116 of the second level 112 can be outside of the network arrangement 100. In other examples, multiple levels of DNS servers can be part of the network arrangement 100, with a higher level(s) of DNS server(s) being outside of the network arrangement 100.

Also, in different examples, each of the levels 110 and 112 can include a different number of DNS servers than shown in FIG. 1.

The DNS servers 114 at the first level 110 receive DNS queries directly from electronic devices (including 102 and 104) over the network 106. A DNS server 114 that receives a DNS query performs a lookup of the domain name included in the DNS query in mapping information stored in a cache memory of the receiving DNS server 114. If a match is identified, then the receiving DNS server 114 returns a DNS response containing a corresponding network address.

However, if a domain name lookup in the cache memory of the receiving DNS server 114 at the first level 110 results in a miss, then the receiving DNS server 114 at the first level 110 sends the DNS query to the DNS server 116 at the second level 112. The DNS server 116 at the second level 112 can perform a lookup of the domain name in mapping information accessible by the DNS server 116, and can return a DNS response based on the lookup. If there are additional levels in the hierarchy 108, any miss by the DNS server 116 at the second level 112 can result in the DNS server 116 forwarding the DNS query to a higher level of the hierarchy 108.

Although the hierarchy 108 of DNS servers is shown as being part of the network arrangement 100, it is noted that in other examples some or all of the DNS servers of the hierarchy 108 can be located outside the network arrangement 100. For example, the network 106 of the network arrangement 100 can be a local area network (LAN) or wide area network (WAN) that belongs to a specific enterprise.

Alternatively, the DNS servers 114 of the first level 110 can be part of a first network, and the DNS server 116 of the second level 112 can be part of a different second network.

In the example of FIG. 1, it is assumed that the electronic device 102 has been infected with a malware code 119, while the electronic device 104 has not been infected with a malware code.

More generally, it is possible that multiple electronic devices are infected with respective malware code. An attacker can use the multiple electronic devices (of the first enterprise) that are infected with malware code to attack another device in a network of a different second enterprise. An "attacker" can refer to an entity or group of entities, where an "entity" can refer to a human, a machine, or a program.

A DNS server (any of 114 or 116) shown in FIG. 1 includes a DNS engine 140. As used here, an "engine" can refer to a hardware processing circuit, which can include any or some combination of a microprocessor, a core of a multi-core microprocessor, a microcontroller, a programmable integrated circuit, a programmable gate array, a digital signal processor, or another hardware processing circuit. Alternatively, an "engine" can refer to a combination of a hardware processing circuit and machine-readable instructions (software and/or firmware) executable on the hardware processing circuit.

The DNS engine 140 performs DNS functionality, which includes performing a lookup of a mapping information 144 stored in a storage medium 142 in response to a received DNS query containing a domain name. The mapping information 144 maps domain names to corresponding network addresses (e.g., IP addresses). The storage medium 142 can be implemented with a storage device or multiple storage devices. The storage medium 142 can be a cache memory in some examples.

The lookup of the mapping information 144 retrieves an entry of the mapping information 144 if the mapping information 144 contains the domain name of the received DNS query.

Defense Against DDoS Attack of Another Enterprise's Name Server

In some examples, by using malware infected electronic devices within the first enterprise's network (or networks of multiple enterprises), an attacker may take down or slow down a name server 118 of the second enterprise, such as a name server serving the domain xyzdomain.com. A name server that serves a particular domain is the server that would be contacted if the DNS servers of the hierarchy 108 have not yet cached information pertaining to the domain name of the particular domain.

To attack the name server 118, the malware code installed on the multiple electronic devices in the first enterprise can issue multiple DNS queries that contain respective domain names, such as <1>.xyzdomain.com, <2>.xyzdomain.com, and so forth, where <i> keeps changing in successive DNS queries.

Assuming that the domain names, <1>.xyzdomain.com, <2>.xyzdomain.com, and so forth, are not present in the cache memories of the DNS severs of the hierarchy 108, the DNS queries containing the domain names will traverse the DNS servers of the hierarchy 108, and will ultimately reach the second enterprise's name server 118. Note that the attacker can craft domain names so as to guarantee that they are not present in the cache memories of the DNS servers in the hierarchy 108.

The name server 118 may not be able to handle the load if the DNS queries from the multiple malware infected electronic devices arrive at the name server 118 at a sufficiently high rate. In addition, a large volume of DNS queries may stress the second enterprise's security system. Additionally, the first enterprise may be liable to the second enterprise for the attack on the second enterprise's name server 118.

The foregoing form of attack on the name server 118 is an example of a distributed denial-of-service (DDoS) attack, since the attacks originate from multiple malware infected electronic devices, which can be spread out in networks of multiple enterprises. This type of DDoS attack is a form of a DNS-based attack, since an attacker leverages DNS server(s) to attack a target resource, which in this example is the name server 118. Other types of DNS-based attacks are discussed further below.

In accordance with some implementations of the present disclosure, to defend against a DNS-based attack (such as an attack of another enterprise's name server), a DNS-based attack defense engine 120 can be included in a DNS server within the hierarchy 108. The DNS-based attack defense engine 120 can be included in a DNS server 114 or 116. Note that an instance of the DNS-based attack defense engine 120 can be deployed in DNS servers of multiple enterprises.

The DNS-based attack defense engine 120 can detect a DNS-based attack, and can trigger a remediation engine 122 to take mitigation action.

For example, the DNS-based attack defense engine 120 can maintain statistics regarding cache misses in the DNS server. A cache miss results if a DNS lookup performed by the DNS engine 140 in response to a DNS query (such as a lookup of the mapping information 144) results in a miss—i.e., the domain name of the DNS query does not exist in the mapping information 144. These statistics are referred to as cache miss statistics 124 stored in a storage medium 126 that is accessible by the DNS-based attack defense engine 120. The storage medium 126 can be implemented with a storage device or multiple storage devices. The storage medium 126 can be a cache memory in some examples. The storage medium 126 can be the same as or separate from the storage medium 142.

The cache miss statistics 124 can include cache miss statistics for a particular electronic device, or can include aggregate cache miss statistics for multiple electronic devices. The cache miss statistics are maintained for a common domain name, such as a top-level domain name such as xyzdomain.com. In the example above, the domain names, <1>.xyzdomain.com, <2>.xyzdomain.com, and so forth, share the common top-level domain name, xyzdomain.com.

Per-device cache miss statistics refer to an indication (e.g., a count) of how many DNS queries pertaining to the common domain name from a particular electronic device resulted in a miss in the cache memory of the DNS server. Effectively, a per-device cache miss count measures the number of DNS queries from an individual electronic device for the given top level domain that were received by the DNS server that did previously receive a DNS query for the given top level domain. Aggregate cache miss statistics refer to an indication (e.g., a count) of how many DNS queries pertaining to the common domain name from multiple electronic devices (such as the electronic devices of a network or enterprise) resulted in a miss in the cache memory of the DNS server.

The storage medium 126 can also store threshold information 128, which can include a threshold (or multiple thresholds) relating to cache misses associated with a domain name. For example, the threshold information 128 can store a per-device cache miss threshold or an aggregate cache miss threshold.

The DNS-based attack defense engine 120 can indicate an attack alert in response to a per-device cache miss count pertaining to a given top level domain name exceeding a per-device cache miss threshold. Similarly, the DNS-based attack defense engine 120 can indicate an attack alert in response to an aggregate cache miss count pertaining to a given top level domain name exceeding an aggregate cache miss threshold. The attack alert can be indicated by setting an indicator, sending a message or notification, and so forth.

In response to the attack alert, the DNS-based attack defense engine 120 can trigger the remediation engine 122 to take a countermeasure action to address the DDoS attack from malware infected electronic devices of the first enterprise on the name server 118 of the second enterprise. The countermeasure action can include any or some combination of the following: rate limit DNS queries to xyzdomain.com for all electronic devices in the first enterprise's network; rate limit communication of data of specific electronic devices in the first enterprise's network; re-image electronic devices from which DNS queries for xyzdomain.com was received and inform the first enterprise's network administrator(s) (re-imaging an electronic device can refer to deleting software and/or firmware from the electronic device and re-installing new software and/or firmware); inform the second enterprise's network administrator(s) about the DDoS attack, and so forth.

Re-imaging an electronic device is an example of modifying the electronic device (in this case modifying machine-readable instructions of the electronic device).

Rate limiting DNS queries or data communication of an electronic device refers to preventing the electronic device from transmitting more than a specified number of DNS queries or a specified amount of data within a given time duration. In other examples, instead of rate limiting DNS queries or data communication, blocking of the DNS queries or data communication can occur, such that DNS queries or data from the blocked electronic device would no longer be processed or forwarded.

In further examples, the DNS-based attack defense engine 120 can store a Bloom filter 130 for each electronic device in the first enterprise's network.

A Bloom filter is a probabilistic data structure that is used to test whether an element is a member of a set. False positive matches are possible, but false negative matches are not. A response to a query to the Bloom filter can indicate that a member is possibly in the set, or definitely not in the set.

In some examples of the present disclosure, the Bloom filter 130 can track which domain names are the subject of DNS queries from a respective electronic device. Note that multiple Bloom filters can be maintained for respective different electronic devices.

As DNS queries containing domain names are received, the DNS-based attack defense engine 120 updates the Bloom filter. When the DNS-based attack defense engine 120 receives a new DNS query containing a domain name, the DNS-based attack defense engine 120 uses the Bloom filter to determine whether the domain name of the new DNS query is part of the set of domain names that have already been received. The Bloom filter 130 can provide two possible responses: 1) the domain name is possibly part of the set, or 2) the domain name is not in the set (in other words, the DNS server has not previously received the domain name).

The DNS-based attack defense engine 120 can quickly ascertain that a domain name is not in the set using the Bloom filter 130. For any domain name that is not in the set, the DNS-based attack defense engine 120 can restrict processing of a DNS query containing the domain name that is not part of the set.

Defense Against DNS Amplification Attack

The foregoing describes an example where the DNS-based attack defense engine 120 is able to detect and trigger a countermeasure against a DDoS attack that attempts to overwhelm a name server (e.g., 118 in FIG. 1).

In further examples, another form of DNS-based attack is a DNS amplification DDoS attack. A DNS amplification attack leverages the fact that a DNS response to a DNS query may be much larger (e.g., a thousand times larger) in size than the DNS query. An example DNS query can be 100 bytes in size, whereas a DNS reply may be considerably larger in size. For example, a DNS query can be a zone transfer DNS query that seeks information regarding a particular zone (e.g., an enterprise, a network, a subnet, etc.).

A DNS amplification attack can be used to take down an entire network instead of just a name server as discussed above.

To perform a DNS amplification attack, an attacker first compromises electronic devices in the first enterprise (such as by causing malware code to be installed on the electronic devices) or in multiple enterprises. The compromised electronic devices can make zone transfer DNS queries to the first enterprise's DNS server, whose DNS responses can be kilobytes or even megabytes in size.

If the attacker wants to take down or slow down the second enterprise's network, then a malware code on a malware infected electronic device in the first enterprise's network can spoof network addresses (e.g., IP addresses) in the DNS queries to make the DNS queries from the malware infected electronic devices in the first enterprise's network appear as if the DNS queries originated from electronic devices in the second enterprise's network. For example, a source network address in a header of a packet containing a DNS query can be changed from a network address of the first enterprise's network to a network address of the second enterprise's network (i.e., a network address that identifies an entity external of the first enterprise's network). This may be easy to accomplish if a connectionless transport protocol such as the User Datagram Protocol (UDP) is used, which is the case for almost all DNS queries.

In response to DNS queries that contain network address(es) within the second enterprise's network, the DNS server in the first enterprise can deliver large DNS responses to a device (or devices) in the second enterprise's network. If an attacker is able to compromise a large number of electronic devices in the first enterprise's network (or networks of multiple enterprises), then the second enterprise's network may not be able to handle the response traffic. For example, a security device or other device in the second enterprise's network may be overwhelmed in trying to process (e.g., examine and/or log) the DNS responses.

In accordance with some implementations of the present disclosure, the DNS-based attack defense engine 120 is able to detect a DNS amplification attack by checking if a DNS query received from an electronic device within the first enterprise's network is included in a packet containing a source address that purports to be from the second enterprise's network. In other words, the DNS-based attack defense engine 120 is able to detect that a packet containing a DNS query includes a source address that does not belong to the first enterprise's network. The DNS-based attack defense engine 120 is able to access network address information 132 in the storage medium 126, where the network address information 132 can indicate an address range of network addresses within the first enterprise's network. The DNS-based attack defense engine 120 can compare the source network address in a packet containing a DNS query with respect to the network address information 132 to determine whether the source network address does not belong to the first enterprise's network (e.g., the source network address is not within the address range of network addresses within the first enterprise's network).

In response to the foregoing detection, the DNS-based attack defense engine 120 drops such a DNS query and does not provide a DNS response to this DNS query. In other words, the DNS-based attack defense engine 120 can prevent such a DNS query from reaching the DNS engine 140, or can notify the DNS engine 140 not to respond to the DNS query. Alternatively, the DNS-based attack defense engine 120 can rate limit processing of DNS queries.

In addition, the DNS-based attack defense engine 120 may inform the network administrators of the first and second enterprises to alert them of the DNS amplification attack.

If the DNS amplification attack detection is performed in a DNS server (e.g., 114) at the first level 110, the DNS server may be able to identify the compromised electronic devices (e.g., based on their Medium Access Control (MAC) addresses). In such an implementation, the DNS server is able to remediate the root cause of the issue, for example, by instructing the remediation engine 122 to disable each compromised electronic device (e.g., powering off the compromised electronic devices, disabling execution of code in the compromised electronic device, etc.).

Defense Against Data Exfiltration

Another form of DNS-based attack is data exfiltration based on use of DNS queries. Data exfiltration refers to the unauthorized copying of a piece of data (e.g., a file, a document, an image, etc.) from within a network to a location outside the network.

For example, suppose an attacker wants to exfiltrate a document from the first enterprise's network after compromising an electronic device (e.g., by loading it with malware code). The document may be stored in the electronic device, or may be accessible by the electronic device. The attacker can set up a domain, e.g., baddomain.com, whose name server 150 is under the control of the attacker. The attacker compromises an electronic device in the first enterprise's network. The attacker, using the malware code, can identify the document to exfiltrate. The malware code can then divide the content of the document into multiple blocks, b1, b2, . . . bn (n>1). The malware code then issues a number of DNS queries that contain the following domain names: b1.baddomain.com, b2.baddomain.com, . . . , bn.baddomain.com. These DNS queries can traverse the DNS servers of the hierarchy 108, which would not have the B*.baddomain.com name in the cache memories of the DNS servers. After traversing the DNS hierarchy 108, the DNS queries reach the attacker-controlled name server 150. The domain names b1.baddomain.com, b2.baddomain.com, . . . , bn.baddomain.com of these DNS queries are retrieved by the attacker, which can reassemble the document by merging blocks b1, b2, . . . , bn (possibly after decoding and/or decrypting the blocks).

To detect DNS-based data exfiltration, the DNS-based attack defense engine 120 can maintain data statistics 134, which can be stored in the storage medium 126. The data statistics 134 can include a measure (or several measures such as byte counts, packet counts, entropy, and information theoretic content) of information exchanged between electronic devices in the first enterprise's network and a specific external domain (e.g., baddomain.com). The data statistics 134 can be maintained on a per-device basis (i.e., data statistics for an individual electronic device) or on an aggregate basis (i.e., aggregated data statistics for multiple electronic devices).

For example, information exchange measure A can maintain a byte or packet count of the amount of information (e.g., number of DNS queries containing a domain name of the external domain) exchanged between electronic device A and the external domain, baddomain.com. If information exchange measure A exceeds a per-device threshold (which can be included in the threshold information 128), the DNS-based attack defense engine 120 detects a data exfiltration attempt and then takes a remediation action.

As another example, information exchange measure T can maintain a byte or packet count of the amount of information exchanged between multiple electronic devices of the first enterprise's network and the external domain, baddomain.com. In such an example, malware code on the multiple electronic devices may attempt to exfiltrate a document by sending out different blocks of the document from different electronic devices (in an attempt to evade detection). If information exchange measure T exceeds an aggregate threshold (which can be included in the threshold information 128), the DNS-based attack defense engine 120 detects a data exfiltration attempt and then takes a remediation action.

Another example of an information exchange measure is an entropy of domain strings exchanged between a device and the external domain.

The following are examples of remediation actions that the remediation engine 122 can perform in response to an indication of a data exfiltration attack from the DNS-based attack defense engine 120. The remediation engine 122 can rate limit electronic device(s) identified by the DNS-based attack defense engine 120 as being involved in the data exfiltration. As another example, the remediation engine 122 can rate limit queries to the external domain identified as being involved in the data exfiltration. As a further example, the remediation engine 122 can completely block all DNS queries from electronic devices to the external domain identified as being involved in the data exfiltration. As yet another example, the remediation engine 122 or the DNS-based attack defense engine 120 can also alert a human or instruct a program or machine to take additional actions, such as taking the involved electronic device(s) offline.

In some examples, threshold(s) in the threshold information 128 can be dynamically adjusted by the DNS-based attack defense engine 120 or another entity (human, program, or machine). For example, a threshold can be lowered to reduce the risk of a successful data exfiltration.

Defense Against Unauthorized Resource Access

Electronic devices in an enterprise's network, especially electronic devices that are infected with malware, may attempt to access internal and external resources in violation of the enterprise's rules. For example, electronic devices may access external cloud services in violation of the enterprise's rules. In most cases, the electronic devices will have to issue DNS queries before accessing respective resources (whether internal or external of the enterprise's network).

The DNS-based attack defense engine 120 can analyze domain names specified by the DNS queries and determine whether the domain names correspond to resources that violate the enterprise's rules. For example, the DNS-based attack defense engine 120 may access a blacklist of domain names, and if a domain name specified in a DNS query is on the blacklist, the DNS-based attack defense engine 120 can issue an alert regarding access of an unauthorized resource.

In other examples, a whitelist of domain names can be maintained, such that a domain name of a DNS query that is not included in the whitelist is considered to correspond to an unauthorized resource.

In response to detecting an access of an unauthorized resource, the DNS-based attack defense engine 120 can return an NXDOMAIN response instead of the requested domain's IP address. The NXDOMAIN response indicates that the domain name does not exist, and can prevent an electronic device from accessing the resource, while giving the enterprise knowledge of the attempted access. In other examples, the DNS-based attack defense engine 120 may enforce more complex access control policies, e.g., allowing access from certain locations and at certain times of the day.

Figure 2:
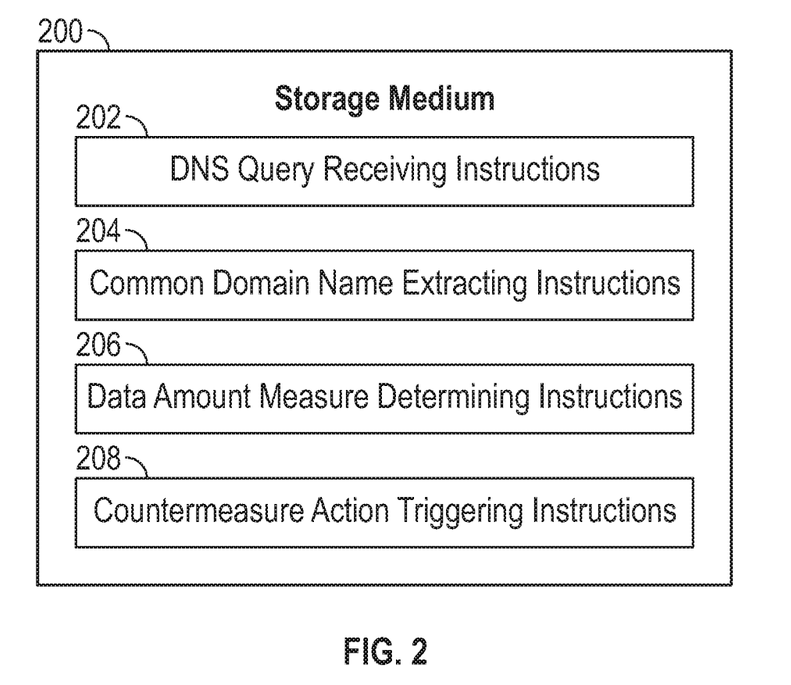
FIG. 2 is a block diagram of a storage medium storing machine-readable instructions according to some examples.

FIG. 2 is a block diagram of a non-transitory machine-readable or computer-readable storage medium 200 that stores machine-readable instructions that upon execution cause a DNS server to perform various tasks. The storage medium 200 includes DNS query receiving instructions 202 to receive, over a network, DNS queries containing domain names.

The machine-readable instructions further include common domain name extracting instructions 204 to extract a common domain name shared by the domain names. The machine-readable instructions further include data amount measure determining instructions 206 to determine whether a measure of an amount of data relating to the DNS queries containing the common domain name exceeds a threshold.

The machine-readable instructions further include countermeasure action triggering instructions 208 to, in response to determining that the measure of the amount of data relating to the DNS queries containing the common domain name exceeds the threshold, trigger a countermeasure action to address a threat associated with the DNS queries.

Figure 3:
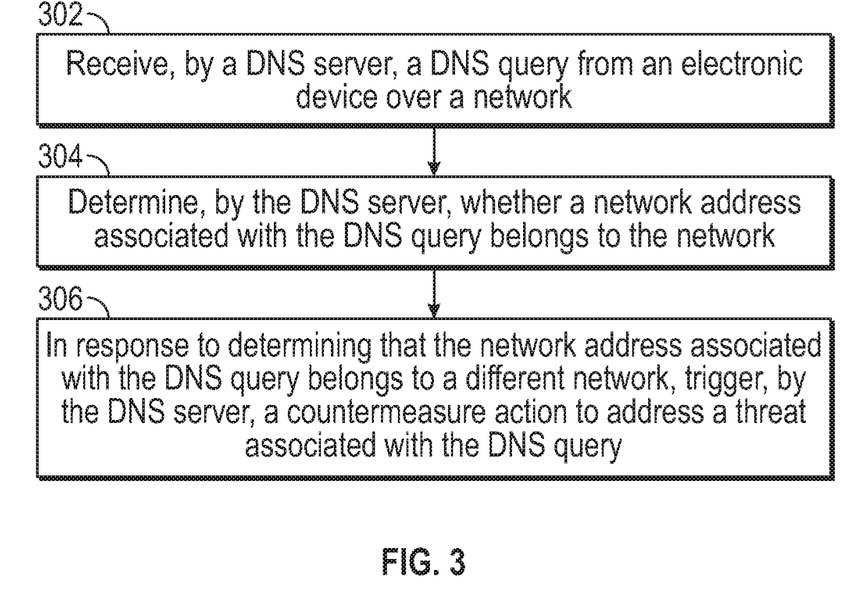
FIG. 3 is a flow diagram of a process according to further examples.

FIG. 3 is a flow diagram of a process of defending against a DNS-based attack. The process includes receiving (at 302), by a DNS server, a DNS query from an electronic device over a network. The process further includes determining (at 304), by the DNS server, whether a network address associated with the DNS query belongs to the network. In response to determining that the network address associated with the DNS query belongs to a different network, the process includes triggering (at 306), by the DNS server, a countermeasure action to address a threat associated with the DNS query.

Figure 4:
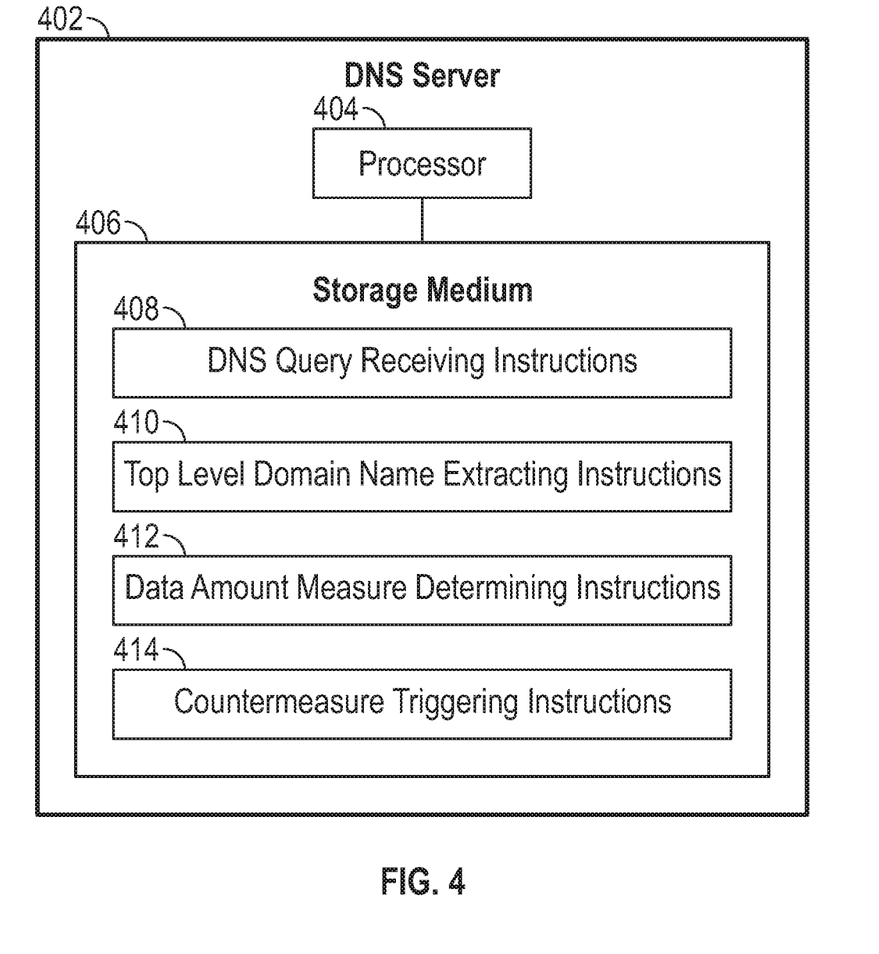
FIG. 4 is a block diagram of a DNS server according to some examples.

FIG. 4 is a block diagram of a DNS server 402 according to some examples. The DNS server 402 includes a hardware processor 404 (or multiple hardware processors). A hardware processor can include a microprocessor, a core of a multi-core microprocessor, a microcontroller, a programmable integrated circuit, a programmable gate array, a digital signal processor, or another hardware processing circuit.

The DNS server 402 further includes a storage medium 406 storing machine-readable instructions executable on the hardware processor 404 to perform various tasks. Machine-readable instructions executable on a hardware processor can refer to the instructions executable on a single hardware processor or the instructions executable on multiple hardware processors.

The machine-readable instructions include DNS query receiving instructions 408 to receive, over a network, DNS queries containing domain names. The machine-readable instructions include top level domain name extracting instructions 410 to extract a top level domain name shared by the domain names. The machine-readable instructions further include data amount measure determining instructions 412 to determine whether a measure of an amount of data relating to the DNS queries containing the top level domain name exceeds a threshold.

The machine-readable instructions additionally include countermeasure triggering instructions 414 to, in response to determining that the measure of the amount of data relating to the DNS queries containing the top level domain name exceeds the threshold, trigger a countermeasure action to address a threat associated with the DNS queries.

The storage medium 200 (FIG. 2) or 406 (FIG. 4) can include any or some combination of the following: a semiconductor memory device such as a dynamic or static random access memory (a DRAM or SRAM), an erasable and programmable read-only memory (EPROM), an electrically erasable and programmable read-only memory (EEPROM) and flash memory; a magnetic disk such as a fixed, floppy and removable disk; another magnetic medium including tape; an optical medium such as a compact disc (CD) or a digital video disc (DVD); or another type of storage device. Note that the instructions discussed above can be provided on one computer-readable or machine-readable storage medium, or alternatively, can be provided on multiple computer-readable or machine-readable storage media distributed in a large system having possibly plural nodes. Such computer-readable or machine-readable storage medium or media is (are) considered to be part of an article (or article of manufacture). An article or article of manufacture can refer to any manufactured single component or multiple components. The storage medium or media can be located either in the machine running the machine-readable instructions, or located at a remote site from which machine-readable instructions can be downloaded over a network for execution.

In the foregoing description, numerous details are set forth to provide an understanding of the subject disclosed herein. However, implementations may be practiced without some of these details. Other implementations may include modifications and variations from the details discussed above. It is intended that the appended claims cover such modifications and variations.

What is claimed is:

1. A non-transitory machine-readable storage medium comprising instructions to defend against a Domain Name System (DNS)-based attack, the instructions upon execution causing a DNS server to:
   receive, over a network, DNS queries containing domain names;
   extract a common domain name shared by the domain names;
   determine whether a measure of an amount of data relating to the DNS queries containing the common domain name exceeds a threshold; and
   in response to determining that the measure of the amount of data relating to the DNS queries containing the common domain name exceeds the threshold, trigger a countermeasure action to address a threat associated with the DNS queries,
   wherein the countermeasure action includes re-imaging an electronic device or a plurality of electronic devices including deleting previous software components and re-installing new software components of the electronic device or the plurality of electronic devices from which DNS queries for the common domain names were received.

2. The non-transitory machine-readable storage medium of claim 1, wherein the measure of the amount of data relating to the DNS queries comprises a count of a number of the DNS queries.

3. The non-transitory machine-readable storage medium of claim 2, wherein the count of the number of the DNS queries comprises a count of the number of the DNS queries that resulted in a cache miss at the DNS server.

4. The non-transitory machine-readable storage medium of claim 2, wherein the count of the number of the DNS queries exceeding the threshold indicates a denial-of-service attack.

5. The non-transitory machine-readable storage medium of claim 2, wherein the count of the number of the DNS queries exceeding the threshold indicates a denial-of-service attack against a name server.

6. The non-transitory machine-readable storage medium of claim 1, wherein the measure of the amount of data relating to the DNS queries comprises a per-device measure of the amount of data relating to the DNS queries received from the electronic device.

7. The non-transitory machine-readable storage medium of claim 1, wherein the measure of the amount of data relating to the DNS queries comprises an aggregate measure of the amount of data relating to the DNS queries received from the plurality of electronic devices.

8. The non-transitory machine-readable storage medium of claim 1, wherein the instructions upon execution cause the DNS server to:
   use a Bloom filter to determine whether a domain name of a DNS query is in a set of domain names received previously by the DNS server.

9. The non-transitory machine-readable storage medium of claim 1, wherein the instructions upon execution cause the DNS server to:
   in response to determining that the measure of the amount of data relating to the DNS queries containing the common domain name exceeds the threshold, indicate a data exfiltration threat.

10. The non-transitory machine-readable storage medium of claim 1, wherein the instructions upon execution cause the DNS server to:
    detect unauthorized access of a resource by the electronic device in response to a DNS query from the electronic device.

11. A method of defending against a Domain Name System (DNS)-based attack, comprising:
    receiving, by a DNS server, a DNS query from an electronic device over a network;
    determining, by the DNS server, whether a network address associated with the DNS query belongs to the network; and
    in response to determining that the network address associated with the DNS query belongs to a different network, triggering, by the DNS server, a countermeasure action to address a threat associated with the DNS query, wherein the countermeasure action includes re-imaging an electronic device or a plurality of electronic devices including deleting previous software components and re-installing new software components of the electronic device or the plurality of electronic devices from which DNS queries for common domain names were received.

12. The method of claim 11, wherein the network address is a source network address identifying a source of the received DNS query.

13. The method of claim 12, wherein the electronic device is part of the network, and the source network address identifies an entity external of the network.

14. The method of claim 11, further comprising:
in response to determining that the network address associated with the received DNS query belongs to a different network, indicating an occurrence of a DNS amplification attack.

15. The method of claim 14, wherein the occurrence of the DNS amplification attack requires a DNS response that is greater than the DNS query.

16. A Domain Name System (DNS) server, comprising: a processor; and a non-transitory machine-readable storage medium storing instructions executable on the processor to:
receive, over a network, DNS queries containing domain names; extract a top level domain name shared by the domain names;
determine whether a measure of an amount of data relating to the DNS queries containing the top level domain name exceeds a threshold; and
in response to determining that the measure of the amount of data relating to the DNS queries containing the top level domain name exceeds the threshold, trigger a countermeasure action to address a threat associated with the DNS queries,
wherein the countermeasure action includes re-imaging an electronic device or a plurality of electronic devices including deleting previous software components and re-installing new software components of the electronic device or the plurality of electronic devices from which DNS queries for common domain names were received.

17. The DNS server of claim 16, wherein the instructions are executable on the processor to:
in response to determining that the measure of the amount of data relating to the DNS queries containing the top level domain name exceeds the threshold, indicate an occurrence of a denial-of-service attack.

18. The DNS server of claim 16, wherein the instructions are executable on the processor to:
in response to determining that the measure of the amount of data relating to the DNS queries containing the top level domain name exceeds the threshold, indicate an occurrence of data exfiltration.

19. The DNS server of claim 16, wherein the instructions are executable on the processor to:
receive a DNS query from the electronic device over the network;
determine whether a network address associated with the DNS query belongs to the network; and
in response to determining that the network address associated with the DNS query belongs to a different network, trigger a countermeasure action to address a threat associated with the DNS query.

20. The DNS server of claim 19, wherein in response to determining that the network address associated with the DNS query belongs to a different network, indicating an occurrence of a DNS amplification attack and wherein the occurrence of the DNS amplification attack requires a DNS response that is greater than the DNS query.

* * * * *